(12) United States Patent
Suryanarayana et al.

(10) Patent No.: US 9,495,535 B2
(45) Date of Patent: Nov. 15, 2016

(54) SYSTEMS AND METHODS FOR AUTHENTICATED SYSTEM PARTITION ACCESS

(71) Applicant: Dell Products L.P., Round Rock, TX (US)

(72) Inventors: Shekar Babu Suryanarayana, Bangalore (IN); Sumanth Vidyadhara, Bangalore (IN); Ankit Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/689,706

(22) Filed: Apr. 17, 2015

(65) Prior Publication Data

US 2016/0306961 A1    Oct. 20, 2016

(51) Int. Cl.
*G06F 21/00* (2013.01)
*G06F 21/44* (2013.01)
*G06F 9/44* (2006.01)
*G06F 21/57* (2013.01)

(52) U.S. Cl.
CPC ............. *G06F 21/44* (2013.01); *G06F 9/4403* (2013.01); *G06F 21/572* (2013.01)

(58) Field of Classification Search
CPC ...... G06F 21/31; G06F 21/57; G06F 21/572; G06F 21/575; G06F 21/577; G06F 21/70; G06F 21/71
See application file for complete search history.

(56) References Cited

U.S. PATENT DOCUMENTS

| 7,546,447 B2 | 6/2009 | Chen et al. |
| 7,574,593 B2 | 8/2009 | Mayfield et al. |
| 2011/0138166 A1* | 6/2011 | Peszek .................. G06F 21/575 713/2 |

* cited by examiner

*Primary Examiner* — Edward Zee
(74) *Attorney, Agent, or Firm* — Jackson Walker L.L.P.

(57) ABSTRACT

In accordance with embodiments of the present disclosure, an information handling system may include a processor, a storage resource communicatively coupled to the processor, and a basic input/output system (BIOS) comprising a program of instructions executable by the processor and configured to cause the processor to initialize one or more information handling resources of the information handling system. The BIOS may be further configured to, during runtime of an operating system, receive an input/output request from the operating system to access a system partition instantiated on the storage resource, authenticate the input/output request, and responsive to authenticating the input/output request, provide a runtime service of the BIOS to complete the input/output request to the system partition.

12 Claims, 3 Drawing Sheets

SYSTEMS AND METHODS FOR AUTHENTICATED SYSTEM PARTITION ACCESS

TECHNICAL FIELD

The present disclosure relates in general to information handling systems, and more particularly to systems and methods for providing secure system partition access to an operating system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many information handling systems, a basic input/output system (BIOS), for example a Unified Extensible Firmware Interface (UEFI), is capable of operating in a pre-boot mode in which the BIOS executes certain instructions prior to loading and execution of an operating system. In an information handling system employing UEFI, a storage resource of the information handling system may include an EFI System Partition (ESP). When an information handling system is powered up and booted, UEFI firmware may load files stored on the ESP to start installed operating systems and various utilities.

Presently, across the industry there are numerous different mechanisms to access an ESP which may vary based on operating system, file system type, or other parameters, and no industry standard to address the access mechanism to an ESP. For example, in Linux systems, gummiboot operates on the ESP only, meaning configuration file fragments, kernels, and other EFI images need to reside on the ESP. Linux kernels must accordingly be built with an appropriate stub to be able to be directly executed as an EFI image. gummiboot may read simple and entirely generic boot loader boot loader configuration files, with one file per boot loader entry to select from, and with all files residing in the ESP. On the other hand, on Apple-Intel architecture Macintosh systems, the ESP may initially be blank and may not be used for booting. However, the ESP may be used as a staging area for firmware updates. As another example, Microsoft recommends that when partitioning a storage resource, the ESP be the first partition on the storage resource, even though this is not a requirement of the UEFI specification itself. On later versions of Microsoft operating systems, access to ESP may be obtained by running a command to mount volumes.

In addition, multiple vulnerabilities may exist in allowing operating systems to access an ESP directly. If an operating system is vulnerable, system recovery embedded in operating system loaders or in a recovery partition may not be accessible once the ESP is corrupted as the ESP is the main partition to access system boot and system-dependent files. In spite of systems enabled with SecureBoot or similar features, SecureBoot is not guaranteed to run in operating system space across all operating systems, and once handover from UEFI to operating system loaded is complete, UEFI SecureBoot functionality is complete. Thus, if the operating system is vulnerable, malicious code may take over an entire system by injecting malware into the ESP, as the ESP is a direct access mechanism from the operating system.

SUMMARY

In accordance with the teachings of the present disclosure, the disadvantages and problems associated with securing access to a system partition of a storage resource by an operating system may be substantially reduced or eliminated.

In accordance with embodiments of the present disclosure, an information handling system may include a processor, a storage resource communicatively coupled to the processor, and a basic input/output system (BIOS) comprising a program of instructions executable by the processor and configured to cause the processor to initialize one or more information handling resources of the information handling system. The BIOS may be further configured to, during runtime of an operating system, receive an input/output request from the operating system to access a system partition instantiated on the storage resource, authenticate the input/output request, and responsive to authenticating the input/output request, provide a runtime service of the BIOS to complete the input/output request to the system partition.

In accordance with these and other embodiments of the present disclosure, a method may include, during runtime of an operating system executing on an information handling system, receiving, by a basic input/output system (BIOS) comprising a program of instructions executable by the processor and configured to cause the processor to initialize one or more information handling resources of the information handling system, an input/output request from the operating system to access a system partition instantiated on a storage resource of the information handling system. The method may also include authenticating, by the BIOS, the input/output request. The method may further include, responsive to authenticating the input/output request, providing a runtime service of the BIOS to complete the input/output request to the system partition.

In accordance with these and other embodiments of the present disclosure, an article of manufacture may include a non-transitory computer readable medium and computer-executable instructions carried on the computer readable medium. The instructions may be readable by a processor, the instructions, when read and executed, for causing the processor to, during runtime of an operating system executing on an information handling system: (i) receive, by a basic input/output system (BIOS) comprising a program of instructions executable by the processor and configured to cause the processor to initialize one or more information handling resources of the information handling system, an input/output request from the operating system to access a system partition instantiated on a storage resource of the information handling system; (ii) authenticate, by the BIOS, the input/output request; and (iii) responsive to authenticating the input/output request, provide a runtime service of the BIOS to complete the input/output request to the system partition.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
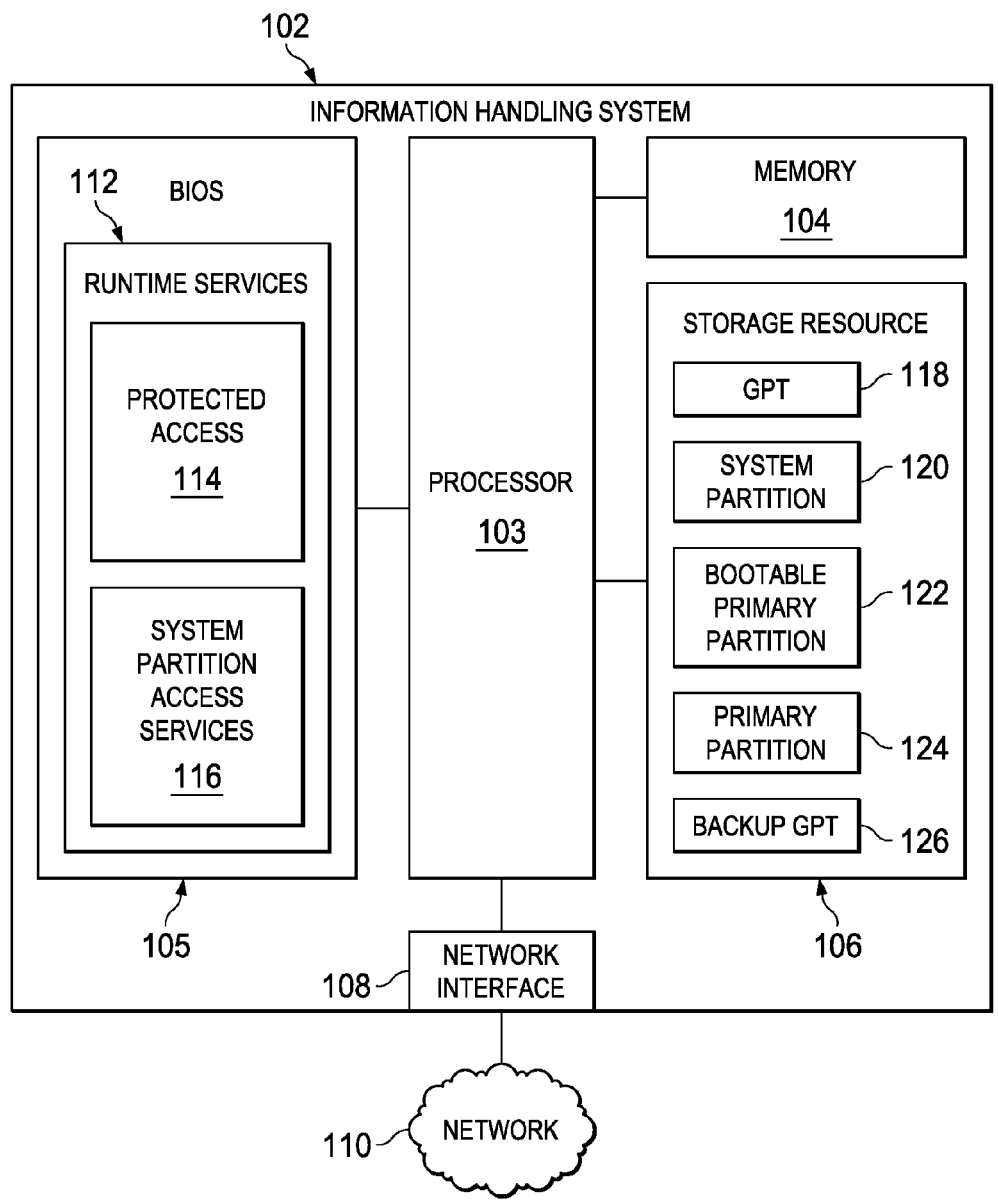
FIG. 1 illustrates a block diagram of an example information handling system, in accordance with embodiments of the present disclosure.
Figure 2:
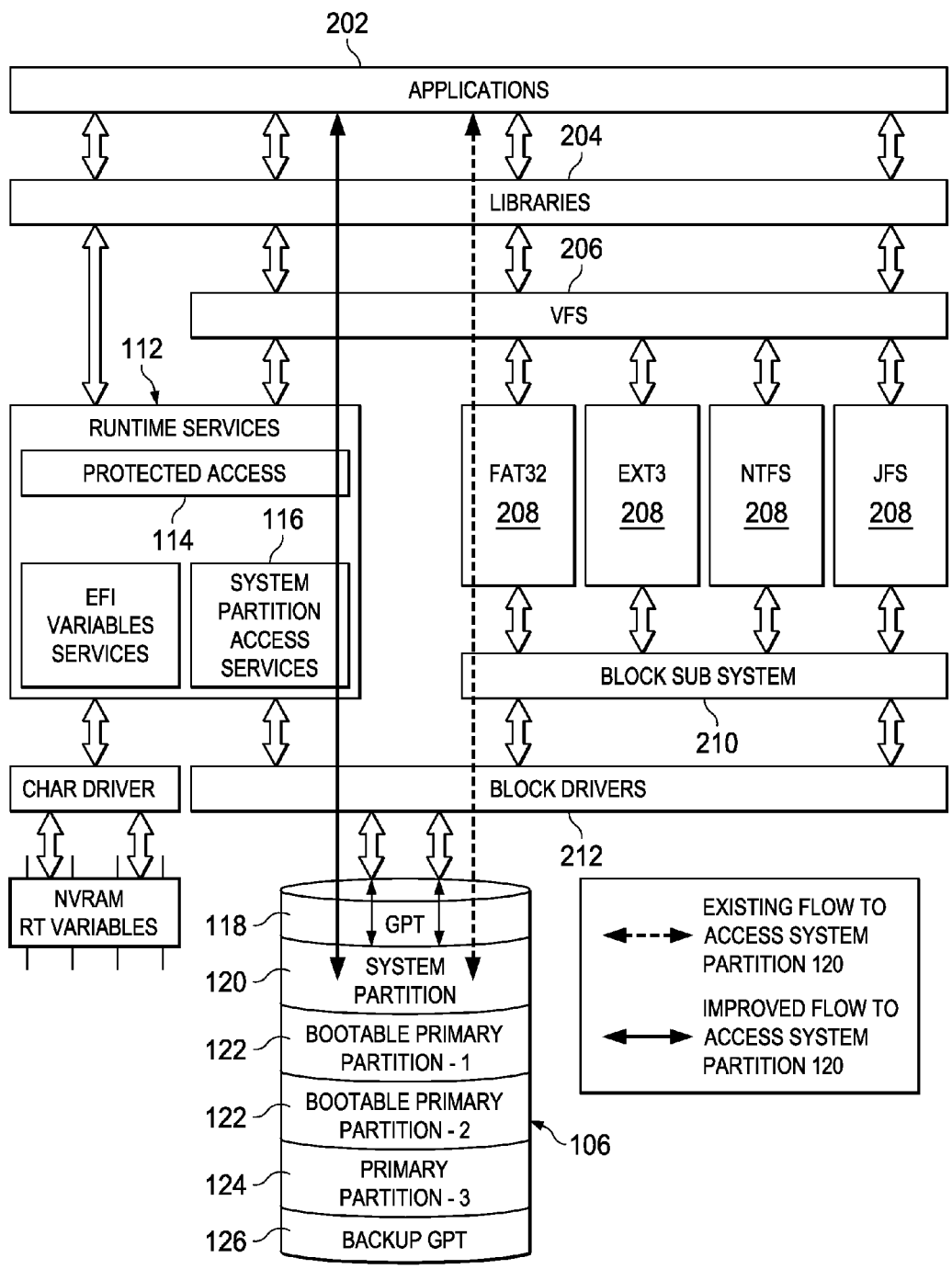
FIG. 2 illustrates a diagram depicting access to a system partition in an operating system mode of an information handling system, in accordance with embodiments of the present disclosure.
Figure 3:
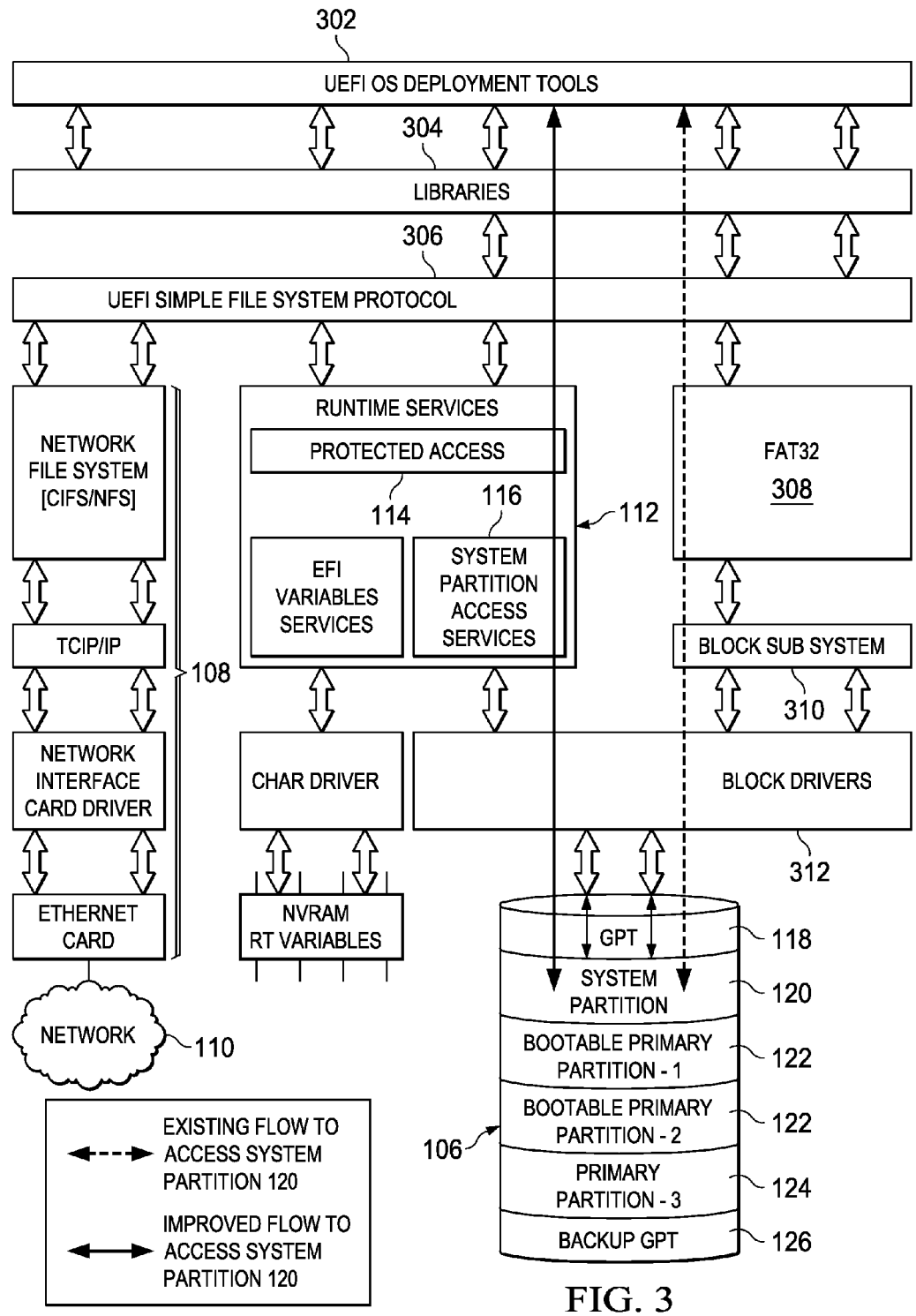
FIG. 3 illustrates a diagram depicting access to a system partition in a pre-boot deployment mode of an information handling system, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may be a portable computing device (e.g., a laptop, notebook, tablet, handheld, smart phone, personal digital assistant, etc.). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104 communicatively coupled to processor 103, a BIOS 105 communicatively coupled to processor 103, a storage resource 106 communicatively coupled to processor 103, and a network interface 108 communicatively coupled to processor 103 and a network 110.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. BIOS 105 may also be configured with functionality for receiving information from network 110 and storing such information in storage resource 106.

As shown in FIG. 1, BIOS 105 may include runtime services 112. A BIOS, and in particular a UEFI-enabled BIOS, may include two types of services: boot services and runtime services. Boot services are only available while the BIOS firmware "owns" an information handling system and before a BIOS passes execution to an operating system. Boot services include text and graphical consoles on various devices, and bus, block and file services. On the other hand, runtime services 112 are services of BIOS 105 that may remain accessible while an operating system is executing; and may include services such as date, time, non-volatile RAM access, and other services. Thus, runtime services 112 may comprise a subset of instructions of BIOS 105. As shown in FIG. 1, runtime services 112 may include a protected access module 114 and system partition access services 116. As described in greater detail elsewhere in this disclosure, protected access module 114 and system partition access services 116 may enable an operating system, during runtime, to access a system partition 120 of storage resource 106 through authenticated services, thus providing security to the system partition 120 even if the operating system has become vulnerable to malicious code.

Storage resource 106 may be communicatively coupled to processor 104 and may include any system, device, or apparatus operable to store information processed by processor 103. Storage resource 106 may include, for example, one or more direct access storage devices (e.g., hard disk drives). Although storage resource 106 is shown as internal to information handling system 102 in FIG. 1, in some embodiments storage resource 106 may be external to information handling system 102. Also, although only one storage resource 106 is depicted in FIG. 1, information handling system 102 may comprise or may be coupled to a plurality of storage resources 106. As shown in FIG. 1, storage resource 106 may comprise globally unique identifier (GUID) partition table (GPT) 118, a system partition 120, a bootable primary partition 122, a primary partition 124, and a backup GPT 126.

GPT 118 may comprise a table or other data structure setting forth the various partitions of storage resource 106 and the locations (e.g., logical block addresses) thereof. To provide redundancy in case of failure, the contents of GPT 118 may be backed up to backup GPT 126.

System partition 120 may comprise a partition of storage resource that includes boot loader programs for installed operating systems of information handling system 102, device driver files for devices present in information handling system 102 that are used by the firmware at boot time, system utility programs that are intended to be run before an operating system is booted, and data files such as error logs.

In addition, system partition 120 may also be accessible during runtime of an operating system such that an operating system may use system partition 120 to store certain utilities, tools, and/or data files of the operating system. In embodiments in which information handling system 102 adheres to UEFI, system partition 120 may comprise an ESP.

Bootable primary partition 122 may comprise a primary partition of storage resource 106 that includes a boot loader for booting an operating system. Although FIG. 1 depicts storage resource 106 having a single bootable primary partition 122, in some embodiments, particularly in those in which information handling system 102 has installed thereon multiple operating systems, storage resource 106 may comprise multiple bootable primary partitions 122.

Primary partition 124 may comprise a partition other than a system partition and a bootable primary partition that includes a single file system, as is known in the art. Although FIG. 1 depicts storage resource 106 having a single primary partition 124, in some embodiments, storage resource 106 may comprise multiple primary partitions 124.

Network interface 108 may comprise any suitable system, apparatus, or device operable to serve as an interface between information handling system 102 and another information handling system and/or a network. Network interface 108 may enable information handling system 102 to communicate using any suitable transmission protocol and/or standard. In some embodiments, network interface 108 may be configured to communicate with other information handling systems via one or more protocols or standards discussed below with respect to network 110. In these and other embodiments, network interface 108 may comprise a network interface card, or "NIC."

As shown in FIG. 1, network interface 108 may be communicatively coupled to a network 110. Network 110 may be a network and/or fabric configured to couple information handling system 102 to one or more other information handling systems. In these and other embodiments, network 110 may include a communication infrastructure, which provides physical connections, and a management layer, which organizes the physical connections and information handling systems communicatively coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In addition to processor 103, memory 104, BIOS 105, storage resource 106, and network interface 108, information handling system 102 may include one or more other information handling resources.

FIG. 2 illustrates a diagram depicting access to system partition 120 in an operating system mode of information handling system 102, in accordance with embodiments of the present disclosure. As shown in FIG. 2, under existing approaches to access system partition 120, an application 202 of or executing on an operating system may access an input/output (I/O) library 204 to issue an I/O command to a virtual file system (VFS) 206, which would then be passed through an actual file system 208, through a block system 210 of a storage stack, and to a block driver 212 to perform the I/O command on system partition 120.

On the other hand, in accordance with the present disclosure, during a boot-device selection phase of a boot, BIOS 105 may add a new entry in a configuration table of runtime services. The new entry may comprise authenticated system partition access services 116 which may include an application programming interface (API) of various I/O services for system partition 120 that may interface with block drivers 212 to access system partition 120. During the boot-device selection phase, operating system loaders in the system partition are then able to access the system partition to create partition access to the operating system. After initialization of information handling system 102 is handed from BIOS 105 to the operating system, I/O requests to system partition 120 may instead be passed to runtime services 112, where protected access module 114 may control access to authenticated services of system partition access services 116, such that for each I/O access to system partition 120 during operating system runtime, BIOS 105 authenticates that the operating system is authorized to perform such I/O command. For example, protected access module 114 may use an authenticated variable concept in which a public/private key mechanism is used to access individual system partition access services 116. The private key may be "owned" by firmware of BIOS 105 with the corresponding public key passed as a variable in an I/O command, thus ensuring protection from any malware in the operating system or self-executing code of the operating system that may gain access to sensitive portions of system partition 120.

FIG. 3 illustrates a diagram depicting access to system partition 120 in a pre-boot operating system deployment mode of information handling system 102, in accordance with embodiments of the present disclosure. Such mode may be present when, for example, BIOS 105 boots via network interface 108 to deploy an operating system image from network 110. As shown in FIG. 3, under existing approaches to access system partition 120 for operating system deployment, deployment image data may be received through a network stack of network interface 108 and deployment tools 302 of BIOS 105 may access an input/output (I/O) library 304 to issue an I/O command to a UEFI simple file system protocol 306, which would then be passed through an actual file system 308, through a block system 310 of a storage stack, and to a block driver 312 to perform the I/O command on system partition 120.

On the other hand, in accordance with the present disclosure, authenticated system partition access services 116 may be created in a manner identical or similar to that of FIG. 2, such that system partition access services 116 include an application programming interface (API) of various I/O services for system partition 120 that may interface with block drivers 212 to access system partition 120. Thus, during pre-boot deployment, I/O requests to system partition 120 may instead be passed to runtime services 112, where protected access module 114 may control access to authenticated services of system partition access services 116, such that for each I/O access to system partition 120 during the pre-boot mode, BIOS 105 authenticates that the deployment tools 302 are authorized to perform such I/O command.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor;
a storage resource communicatively coupled to the processor; and
a basic input/output system (BIOS) comprising a program of instructions executable by the processor and configured to cause the processor to initialize one or more information handling resources of the information handling system, wherein the BIOS is further configured to:
during runtime of an operating system:
receive an input/output request from the operating system to access a system partition instantiated on the storage resource;
authenticate the input/output request; and
responsive to authenticating the input/output request, provide a runtime service of the BIOS to complete the input/output request to the system partition; and
prior to runtime of the operating system, add a new entry in a configuration table of runtime services of the BIOS during a boot-device selection phase of a boot of the information handling system, the new entry comprising a plurality of authenticated runtime services including the runtime service.

2. The information handling system of claim 1, wherein the BIOS comprises a Unified Extensible Firmware Interface.

3. The information handling system of claim 1, wherein the system partition comprises an Extensible Firmware Interface System Partition.

4. The information handling system of claim 1, wherein the runtime service interfaces with one or more block drivers to access the system partition.

5. A method comprising:
   during runtime of an operating system executing on an information handling system:
      receiving, by a basic input/output system (BIOS) comprising a program of instructions executable by the processor and configured to cause the processor to initialize one or more information handling resources of the information handling system, an input/output request from the operating system to access a system partition instantiated on a storage resource of the information handling system;
      authenticating, by the BIOS, the input/output request; and
      responsive to authenticating the input/output request, providing a runtime service of the BIOS to complete the input/output request to the system partition; and
   prior to runtime of the operating system, adding a new entry in a configuration table of runtime services of the BIOS during a boot-device selection phase of a boot of the information handling system, the new entry comprising a plurality of authenticated runtime services including the runtime service.

6. The method of claim 5, wherein the BIOS comprises a Unified Extensible Firmware Interface.

7. The method of claim 5, wherein the system partition comprises an Extensible Firmware Interface System Partition.

8. The method of claim 5, further comprising, interfacing, by the runtime service, with one or more block drivers to access the system partition.

9. An article of manufacture comprising:
   a non-transitory computer readable medium; and
   computer-executable instructions carried on the computer readable medium, the instructions readable by a processor, the instructions, when read and executed, for causing the processor to:
      during runtime of an operating system executing on an information handling system:
         receive, by a basic input/output system (BIOS) comprising a program of instructions executable by the processor and configured to cause the processor to initialize one or more information handling resources of the information handling system, an input/output request from the operating system to access a system partition instantiated on a storage resource of the information handling system;
         authenticate, by the BIOS, the input/output request; and
         responsive to authenticating the input/output request, provide a runtime service of the BIOS to complete the input/output request to the system partition; and
      prior to runtime of the operating system, add a new entry in a configuration table of runtime services of the BIOS during a boot-device selection phase of a boot of the information handling system, the new entry comprising a plurality of authenticated runtime services including the runtime service.

10. The article of claim 9, wherein the BIOS comprises a Unified Extensible Firmware Interface.

11. The article of claim 9, wherein the system partition comprises an Extensible Firmware Interface System Partition.

12. The article of claim 9, the instructions for further causing the processor to interface the runtime service with one or more block drivers to access the system partition.

* * * * *